(12) United States Patent
Li

(10) Patent No.: US 11,317,763 B2
(45) Date of Patent: May 3, 2022

(54) MULTIFUNCTIONAL KITCHEN COOKING UTENSIL

(71) Applicant: Yangjiang City Xiangmao Trading Co., Ltd., Yangjiang (CN)

(72) Inventor: Guimin Li, Benxi (CN)

(73) Assignee: YANGJIANG CITY XIANGMAO TRADING CO., LTD., Yangjiang (CN)

(*) Notice: Subject to any disclaimer, the term of this patent is extended or adjusted under 35 U.S.C. 154(b) by 178 days.

(21) Appl. No.: 16/917,041

(22) Filed: Jun. 30, 2020

(65) Prior Publication Data

US 2021/0401229 A1 Dec. 30, 2021

(30) Foreign Application Priority Data

Jun. 25, 2020 (CN) .......................... 202021200108.2

(51) Int. Cl.
*A47J 43/06* (2006.01)
*A47J 43/25* (2006.01)
(Continued)

(52) U.S. Cl.
CPC .............. *A47J 43/06* (2013.01); *A21C 11/106* (2013.01); *A47J 19/04* (2013.01); *A47J 19/06* (2013.01); *A47J 43/25* (2013.01)

(58) Field of Classification Search
CPC .......... A47J 43/06; A47J 43/25; A47J 43/255; A47J 19/04; A47J 19/06; A47J 17/02;
(Continued)

(56) References Cited

U.S. PATENT DOCUMENTS 1,486,255 A * 3/1924 Lambert ............. A47J 43/1087
366/129
1,895,833 A * 1/1933 Baker ................. A47J 43/1087
241/301

(Continued)

FOREIGN PATENT DOCUMENTS

DE 917145 C * 7/1949 ............. A47J 19/06
EP 3195771 A1 * 7/2017 ............. A47J 43/25

(Continued)

*Primary Examiner* — Jessica Cahill
*Assistant Examiner* — Jared O Brown
(74) *Attorney, Agent, or Firm* — Muncy, Geissler, Olds & Lowe, P.C.

(57) ABSTRACT

The present disclosure provides a multifunctional kitchen cooking utensil. The multifunctional kitchen cooking utensil includes an upper assembly and a base supporting the upper assembly. The upper assembly includes a handle, a primary connecting piece, a secondary connecting piece, and a tool piece. The handle is connected to upper ends of the primary connecting piece and the secondary connecting piece. The tool piece is detachably connected to lower ends of the primary connecting piece and the secondary connecting piece. With the above structure, a hole slot which facilitates replacements of a plurality of tool pieces is arranged on the lower ends of the primary connecting piece and the secondary connecting piece, such that multifunctionality of the kitchen cooking utensil may be implemented, and an effect of an integrated utensil is achieved.

3 Claims, 13 Drawing Sheets

(51) Int. Cl.
  *A21C 11/10* (2006.01)
  *A47J 19/04* (2006.01)
  *A47J 19/06* (2006.01)

(58) Field of Classification Search
  CPC ...... A47J 43/10; A47J 43/1087; A47J 43/288;
        A21C 11/106; B26B 5/00; B26B 11/00;
        B26D 3/26; B01F 33/5014
  USPC .................................................. 241/95, 273.1
  See application file for complete search history.

(56) References Cited

U.S. PATENT DOCUMENTS

| 1,902,525 | A | * | 3/1933 | Rowley | ............... | A47J 43/1087 |
| | | | | | | 366/129 |
| 1,910,229 | A | * | 5/1933 | Baker | ................ | B01F 33/5011 |
| | | | | | | 241/169 |
| 8,851,738 | B2 | * | 10/2014 | Kent | ........................ | A47J 43/28 |
| | | | | | | 366/129 |
| 2005/0155186 | A1 | * | 7/2005 | McGuyer | ............... | A47J 43/288 |
| | | | | | | 16/430 |
| 2006/0200912 | A1 | * | 9/2006 | Jackson | .................... | A01B 1/00 |
| | | | | | | 7/110 |
| 2008/0190304 | A1 | * | 8/2008 | Sawhney | ................ | A47J 43/25 |
| | | | | | | 83/13 |
| 2014/0090179 | A1 | * | 4/2014 | Stacy | ...................... | A47J 43/28 |
| | | | | | | 7/113 |
| 2018/0049595 | A1 | * | 2/2018 | Leibovitch | ............... | A47J 43/25 |

FOREIGN PATENT DOCUMENTS

| GB | 2422290 | A | * | 7/2006 | ............. | A47J 19/06 |
| KR | 200413047 | Y1 | * | 4/2006 | ............. | B26D 3/26 |
| KR | 20160087502 | A | * | 7/2016 | ............. | A47J 17/02 |

* cited by examiner

MULTIFUNCTIONAL KITCHEN COOKING UTENSIL

TECHNICAL FIELD

The present disclosure relates to the manufacturing of kitchen utensils for grinding ginger, vegetable grating, vegetable slicing, garlic pressing, and potato pressure granulation, and noodle cutoff, and in particular, relates to a multifunctional kitchen cooking utensil.

BACKGROUND

With constant improvement of people's living standard, in well-off families diversified kitchen utensils are being used, for example, vegetable slicers, vegetable graters, ginger grinders, potato granulators, garlic presses, and noodle cutters, which are all commonly used utensils in modern families. However, in the related art, the vegetable slicer, the vegetable grater, ginger grinder, the potato granulator, the garlic press, and the noodle cutter are mostly separately manufactured or machined. As a result, a large amount of space and a large quantity of resources are unnecessarily consumed. At present, in urban areas, the dwelling price is extremely high, and the area of the kitchen of a house is very limited. Especially, in Hong Kong and Macao of China, Europe, Japan, and other developed countries, due to the high dwelling price, the kitchens are generally very small and narrow, and the minimum kitchen may be one to two square meters. Therefore, deployment of such separate and independent utensils in such small and narrow kitchens may scarify the limited space of the kitchens. Accordingly, an inventive concept of the present disclosure is to design a multifunctional kitchen cooking utensil integrating uses of a plurality of tools.

SUMMARY

To overcome the defects in the related art, the present disclosure provides a novel multifunctional kitchen cooking utensil which features simple structure, compactness, and convenience and practicability, and is capable of implementing a plurality of functions by assembling.

The present disclosure is practiced by the following technical solutions:

According to a technical solution employed by the present disclosure, the multifunctional kitchen cooking utensil is provided. The multifunctional kitchen cooking utensil includes an upper assembly and a base supporting the upper assembly; wherein the upper assembly comprises a handle, a primary connecting piece, a secondary connecting piece, and a tool piece, the handle being connected to upper ends of the primary connecting piece and the secondary connecting piece, the tool piece being detachably connected to lower ends of the primary connecting piece and the secondary connecting piece, the upper ends of the primary connecting piece and the second connecting piece being both provided with a pin hole, opposite open side surfaces of the pin hole being provided with a projection receivable in a hole position of the handle, the projection being received in the hole position and passing through the pin by a screw to be fixedly connected to the handle, the upper end of the primary connecting piece being bent and provided with a button, the lower end of the primary connecting piece and the secondary connecting piece being provided with a hole slot, two ends of the tool piece being each provided with a circular pin mated and engaged with the hole slot, two ends of the circular pin being provided with a protruded ring, and the protruded ring being engaged with a recessed ring arranged on an inner wall of the hole slot; wherein when the circular pin is inserted into the hole slot, the tool piece is movably connected to the lower ends of the primary connecting piece and the secondary connecting piece and is locked by engagement of the protruded ring and the recessed ring, the tool piece is locked to the lower ends of the primary connecting piece and the second connecting piece and received in the base, two sides of the base each protrude to define a protruded edge, a middle of the base is recessed to define a groove, the base is further provided with a cap opener, a lifted edge, a plateau, and diamond teeth, wherein the cap opener is arranged on a left end of the base, the lifted edge is slightly sharp and configured to lift up pomelo peel to a right end of the base, the plateau is arranged on a lower end portion of the base and in contact with a table to prevent the upper assembly from rolling, and the diamond teeth are configured to grind ginger.

The tool piece includes a slicer, a grater, a noodle cutter, a potato granulator, and a garlic press; wherein two ends of each of the slicer, the grater, the noodle cutter, the potato granulator, and the garlic press are each provided with the circular pin engaged with the hole slot, and the circular pin of each of these tool pieces is provided with the protruded ring.

A bottom of the hole slot is provided with a gap, the hole slot is resilient and compressible, when the circular pin is inserted into the slot groove, the hole slot expands outwards, and when the circular pin is wholly inserted, two ends of the circular pin are aligned with two ends of the hole slot and compressed in the hole slot, such that the protruded ring is engaged within the recessed ring to fix the tool piece.

As compared with the prior art, the present disclosure has the following advantages:

With the above structure according to the present disclosure, by effectively using the hole slot which facilitates replacements of a plurality of tool pieces and is arranged on the lower ends of the primary connecting piece and the secondary connecting piece, multifunctionality of the kitchen cooking utensil may be implemented, an effect of integrated uses of the utensil is achieved, and a multifunctional kitchen cooking utensil is provided for people. In addition, the utensil according to the present disclosure saves space and resources, features powerful functionality, convenient and practical use, and novel design, and thus the utensil is popular among consumers.

In addition to the above described objects, features, and advantages, the present disclosure still has other objects, features, and advantages. The present disclosure is further described hereinafter with reference to the accompanying drawings.

BRIEF DESCRIPTION OF THE DRAWINGS

The accompanying drawings herein, which are incorporated herein and constitute a part of the specification, illustrate several exemplary embodiments of the present invention and together with the description, serve to illustrate the present disclosure, construing no limitation to the present disclosure. In the drawings.

DETAILED DESCRIPTION

It needs to be noted that in case of no conflict, embodiments and features in the embodiments of the present disclosure may be combined. The present disclosure is described hereinafter in detail with reference to the accompanying drawings and specific embodiments.

Figure 1:
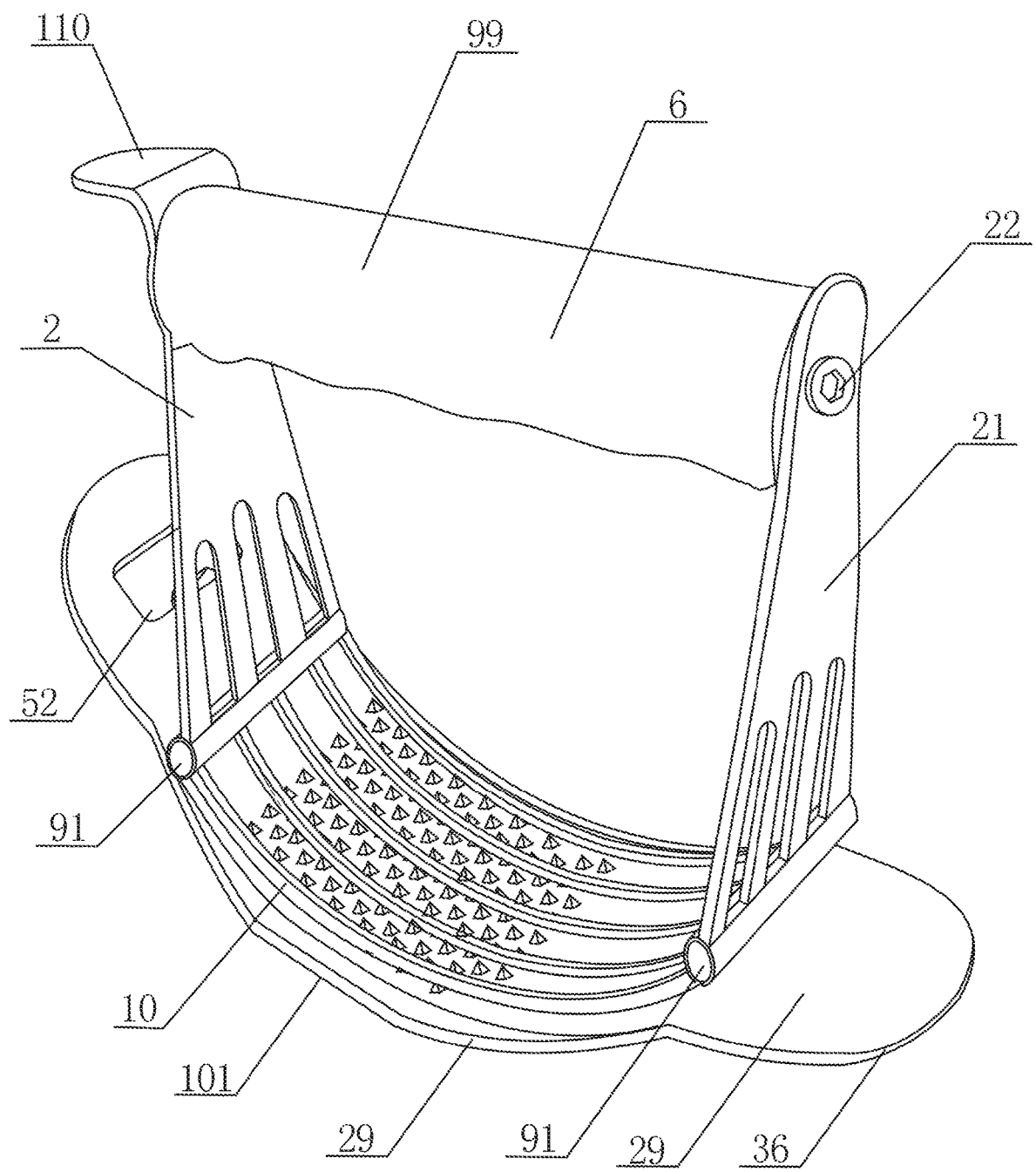
FIG. 1 is a schematic structural view of a multifunctional kitchen cooking utensil according to a preferred embodiment of the present disclosure.
Figure 2:
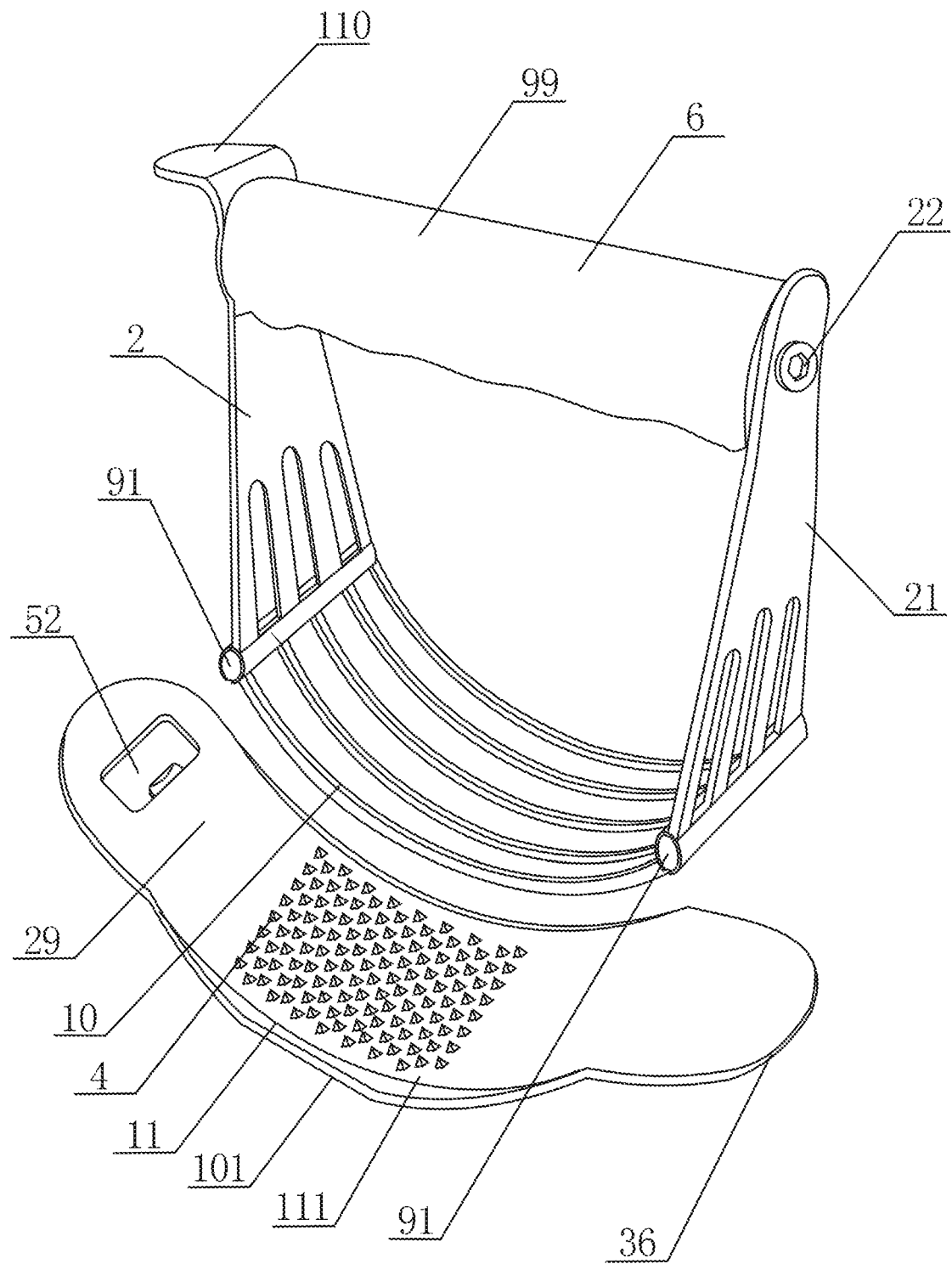
FIG. 2 is a schematic structural view illustrating separation of an upper assembly and a base of the multifunctional kitchen cooking utensil in FIG. 1 according to a preferred embodiment of the present disclosure.
Figure 3:
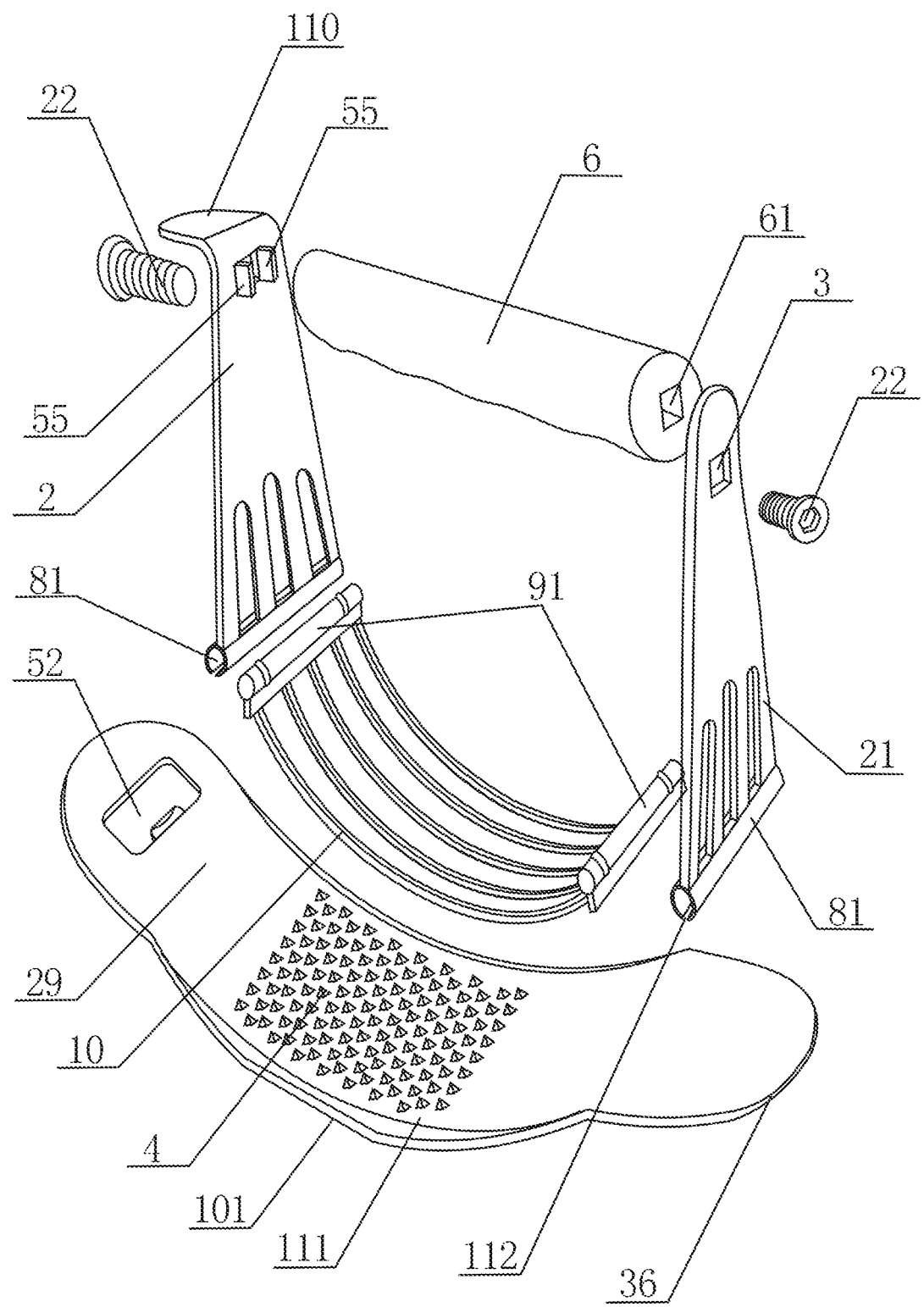
FIG. 3 is a schematic exploded structural view of the multifunctional kitchen cooking utensil in FIG. 1 according to a preferred embodiment of the present disclosure.
Figure 4:
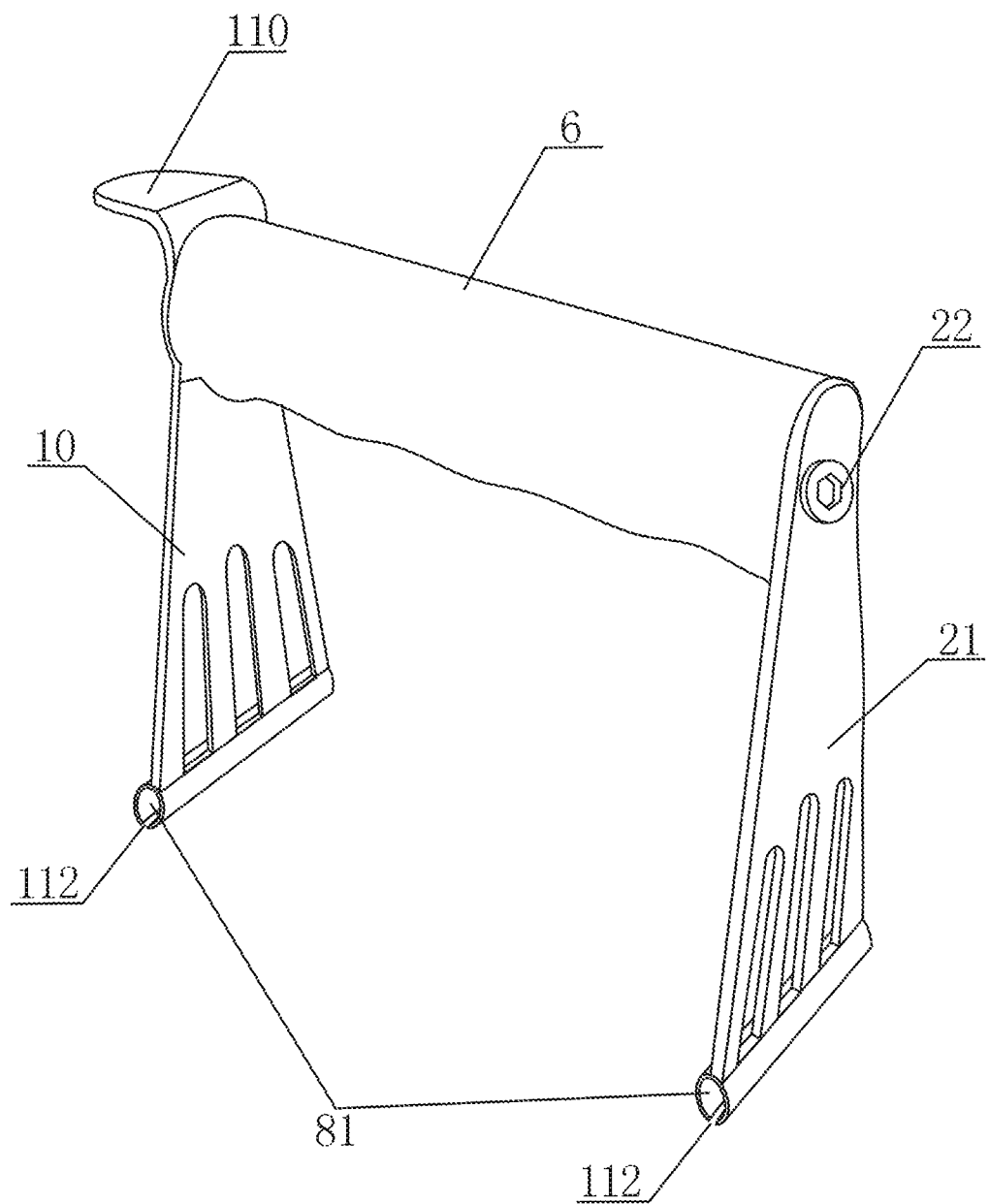
FIG. 4 is a schematic structural view illustrating connection between a handle between upper ends of a primary connecting piece and a secondary connecting piece of the multifunctional kitchen cooking utensil according to a preferred embodiment of the present disclosure.
Figure 5:
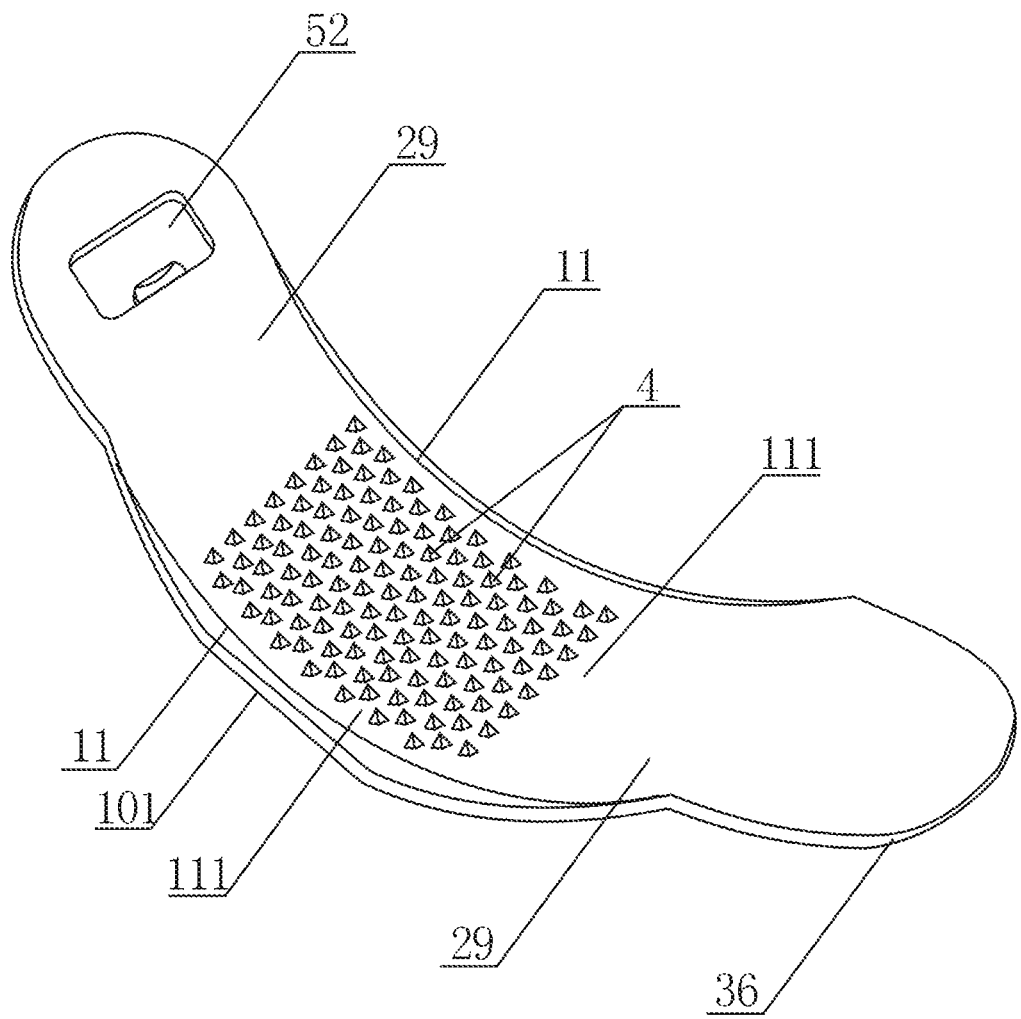
FIG. 5 is a schematic structural view of the base of the multifunctional kitchen cooking utensil according to a preferred embodiment of the present disclosure.
Figure 6:
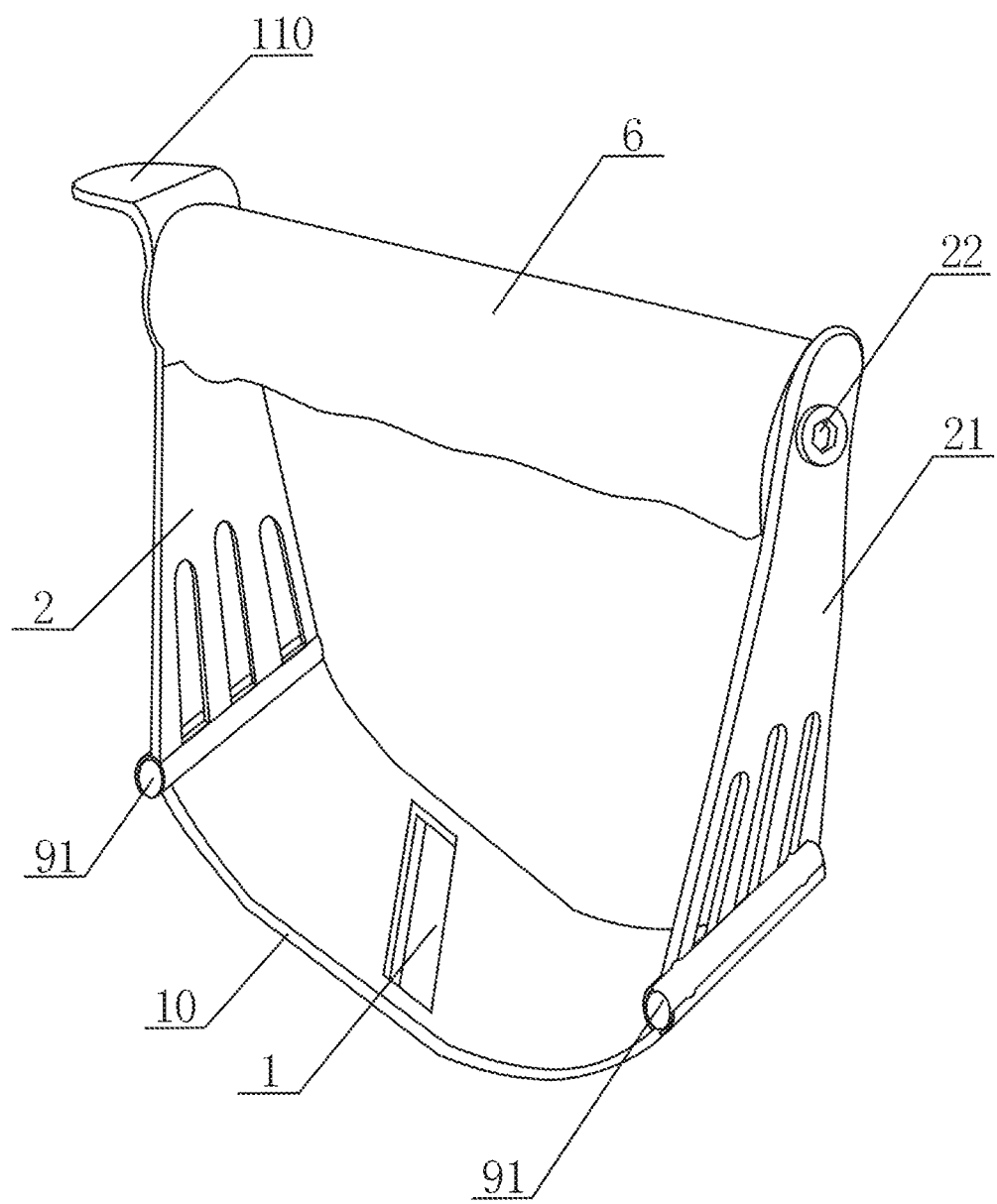
FIG. 6 is a schematic structural view illustrating connection between a slicer between lower ends of the primary connecting piece and the secondary connecting piece of the multifunctional kitchen cooking utensil according to a preferred embodiment of the present disclosure.
Figure 7:
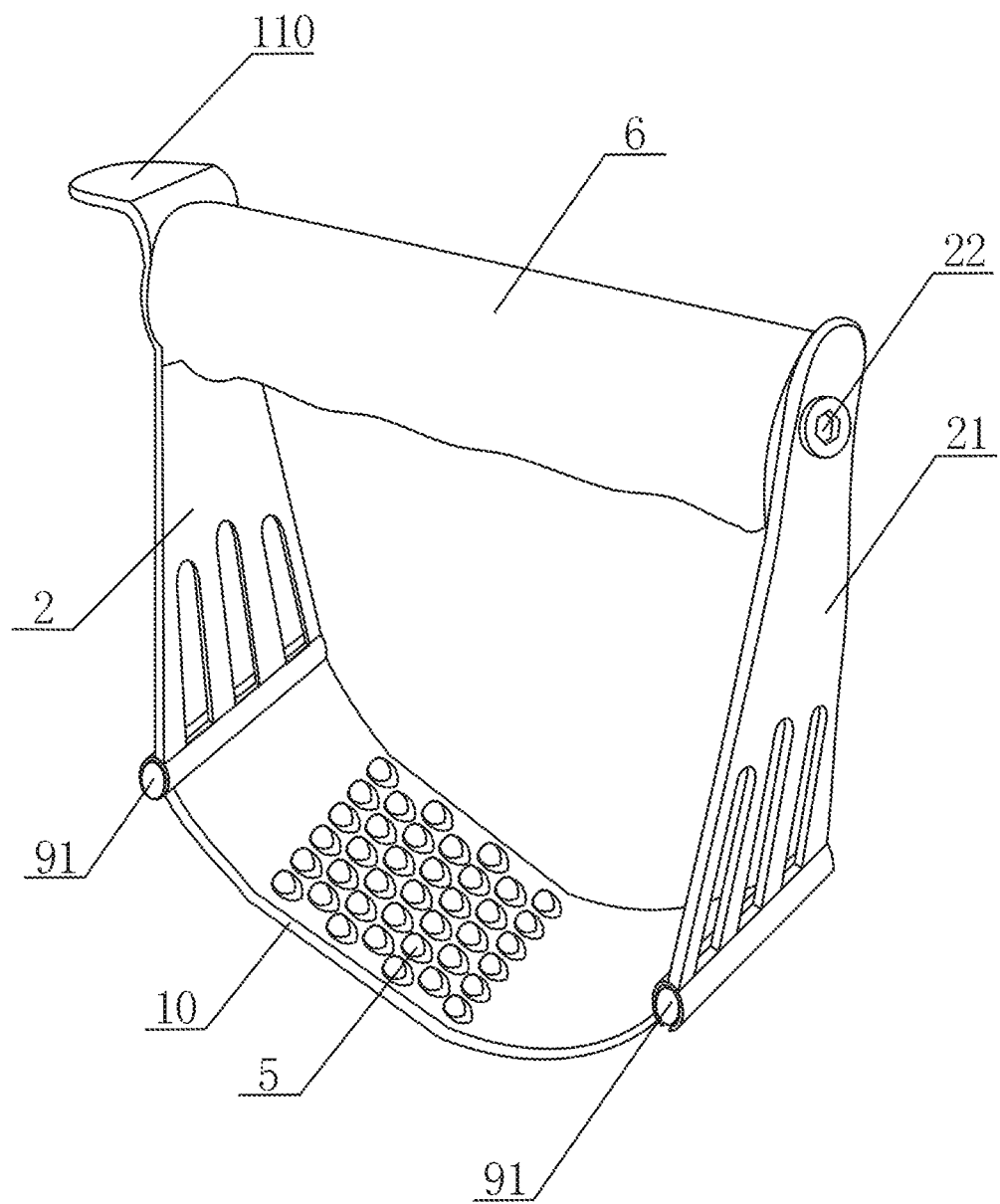
FIG. 7 is a schematic structural view illustrating connection between a grater between the lower ends of the primary connecting piece and the secondary connecting piece of the multifunctional kitchen cooking utensil according to a preferred embodiment of the present disclosure.
Figure 8:
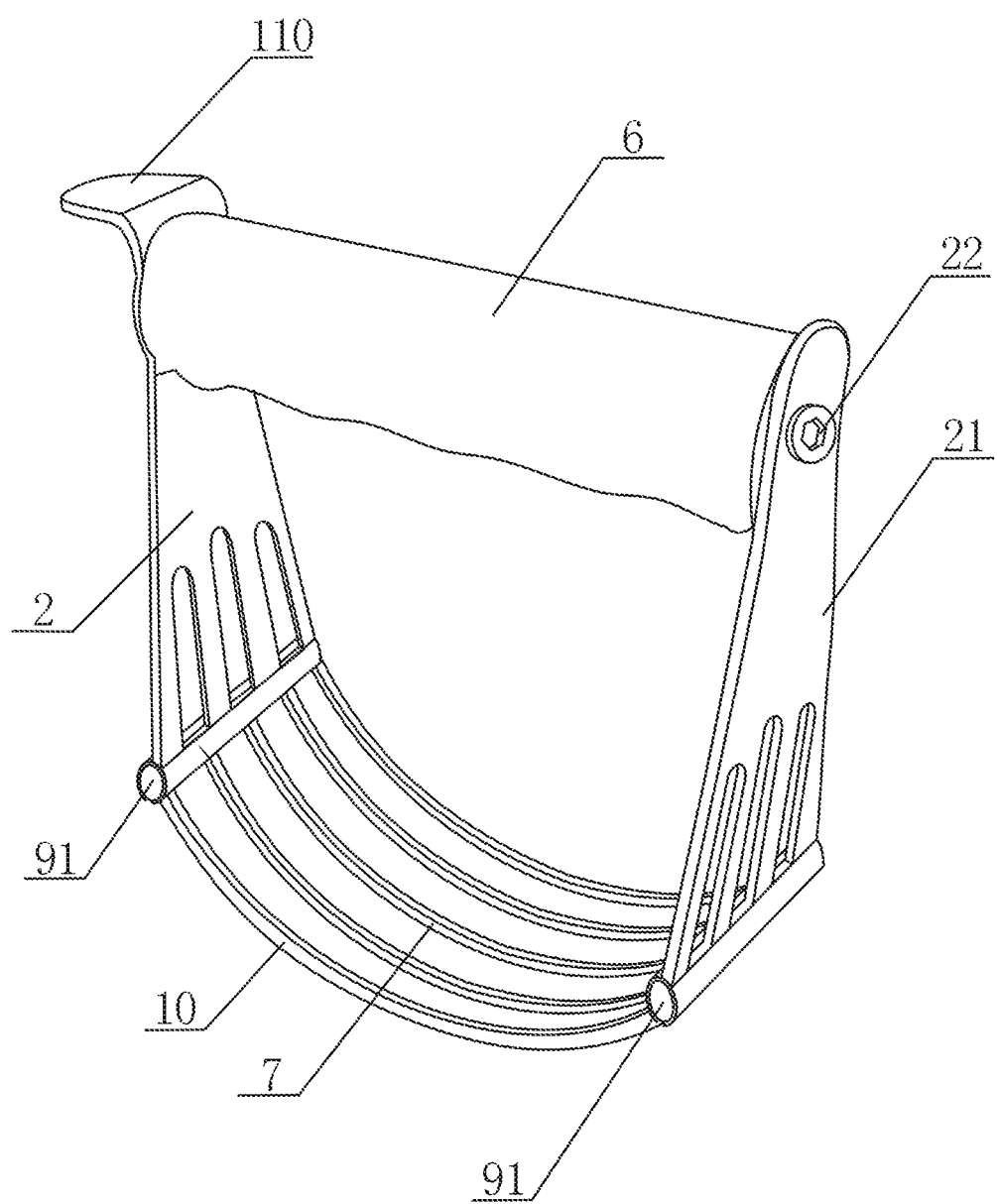
FIG. 8 is a schematic structural view illustrating connection between a noodle cutter between the lower ends of the primary connecting piece and the secondary connecting piece of the multifunctional kitchen cooking utensil according to a preferred embodiment of the present disclosure.
Figure 9:
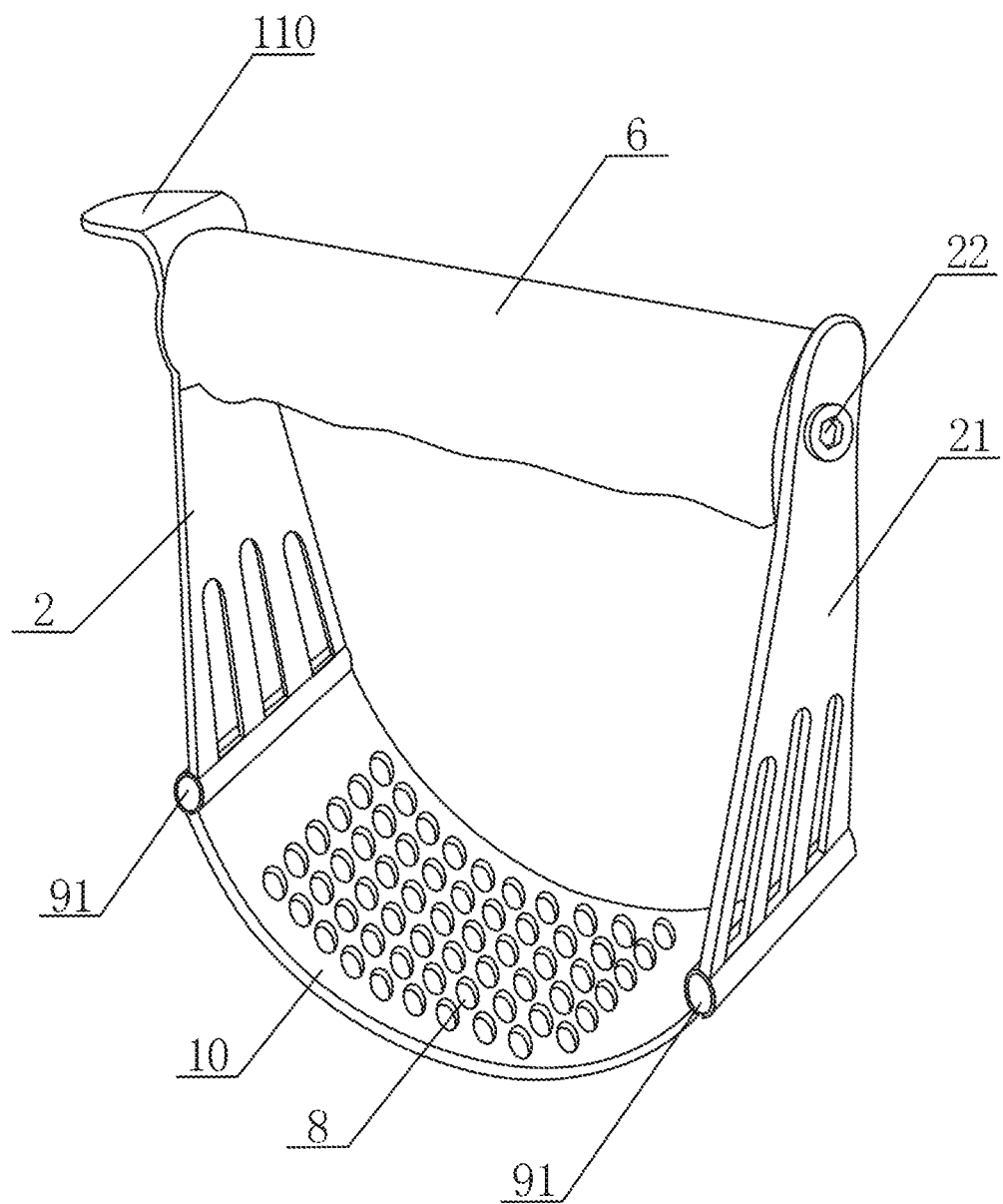
FIG. 9 is a schematic structural view illustrating connection between a potato granulator between the lower ends of the primary connecting piece and the secondary connecting piece of the multifunctional kitchen cooking utensil according to a preferred embodiment of the present disclosure.
Figure 10:
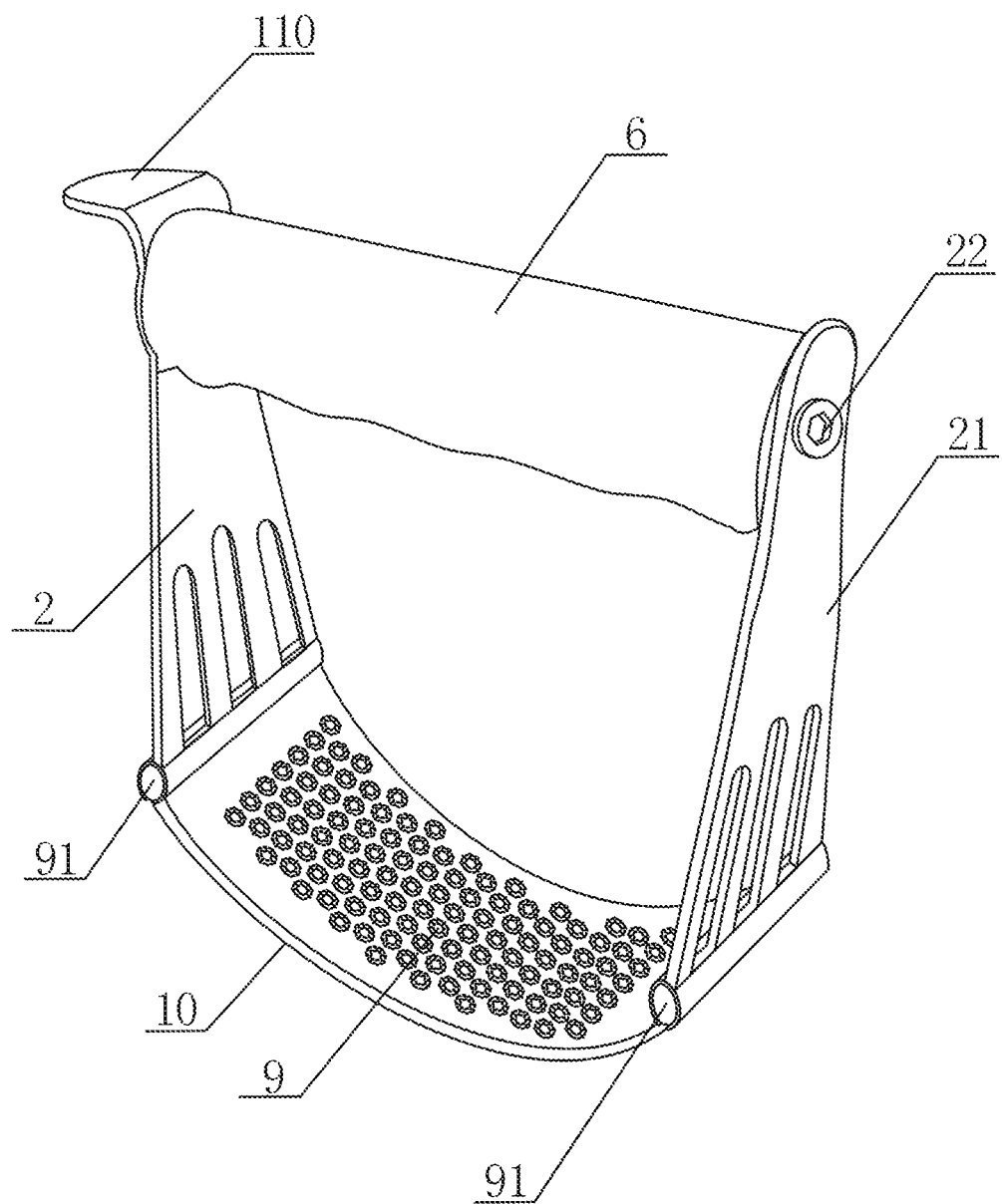
FIG. 10 is a schematic structural view illustrating connection between a garlic press between the lower ends of the primary connecting piece and the secondary connecting piece of the multifunctional kitchen cooking utensil according to a preferred embodiment of the present disclosure.

With reference to FIG. 1, FIG. 2, FIG. 3, FIG. 4, FIG. 5, FIG. 6, FIG. 7, FIG. 8, FIG. 9, and FIG. 10, the present disclosure provides a multifunctional kitchen cooking utensil. The multifunctional kitchen cooking utensil includes an upper assembly 99 and a base 29 supporting the upper assembly; wherein the upper assembly comprises a handle 6, a primary connecting piece 2, a secondary connecting piece 21, and a tool piece 10, the handle being connected to upper ends of the primary connecting piece and the secondary connecting piece, the tool piece being detachably connected to lower ends of the primary connecting piece and the secondary connecting piece, the upper ends of the primary connecting piece and the second connecting piece being both provided with a pin hole 3, opposite open side surfaces of the pin hole being provided with a projection 55 receivable in a hole position 61 of the handle, the projection being received in the hole position and passing through the pin by a screw 22 to be fixedly connected to the handle, the upper end of the primary connecting piece being bent and provided with a button 110, the lower end of the primary connecting piece and the secondary connecting piece being provided with a hole slot 81, two ends of the tool piece being each provided with a circular pin 91 mated and engaged with the hole slot, two ends of the circular pin being provided with a protruded ring 51, and the protruded ring being engaged with a recessed ring arranged on an inner wall of the hole slot; wherein when the circular pin is inserted into the hole slot, the tool piece is movably connected to the lower ends of the primary connecting piece and the secondary connecting piece and is locked by engagement of the protruded ring and the recessed ring, the tool piece is locked to the lower ends of the primary connecting piece and the second connecting piece and received in the base, two sides of the base each protrude to define a protruded edge 11, a middle of the base is recessed to define a groove 111, the base is further provided with a cap opener 52, a lifted edge 36, a plateau 101, and diamond teeth 4, wherein the cap opener is arranged on a left end of the base, the lifted edge is slightly sharp and configured to lift up pomelo peel to a right end of the base, the plateau is arranged on a lower end portion of the base and in contact with a table to prevent the upper assembly from rolling, and the diamond teeth are configured to prepare grind ginger.

Figure 11:
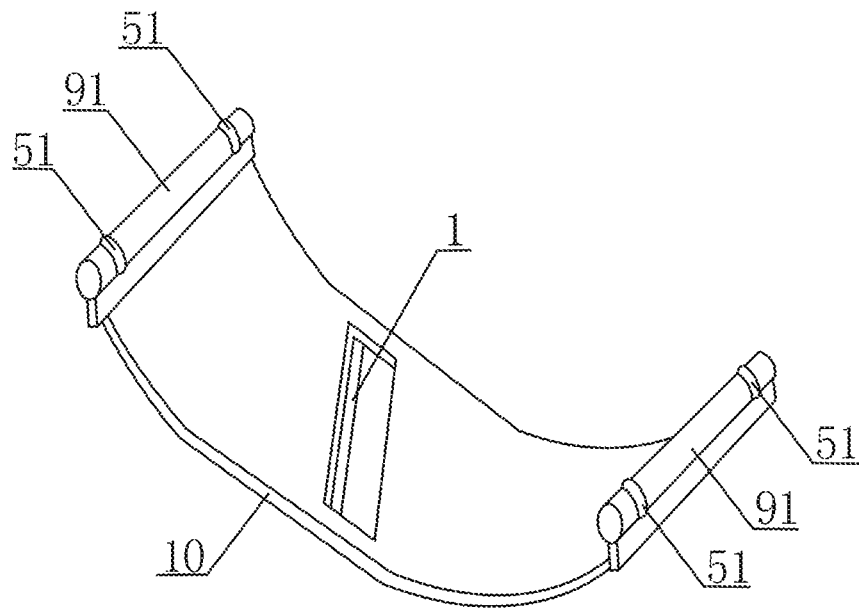
FIG. 11 is a schematic structural view of the slicer of the multifunctional kitchen cooking utensil according to a preferred embodiment of the present disclosure.
Figure 12:
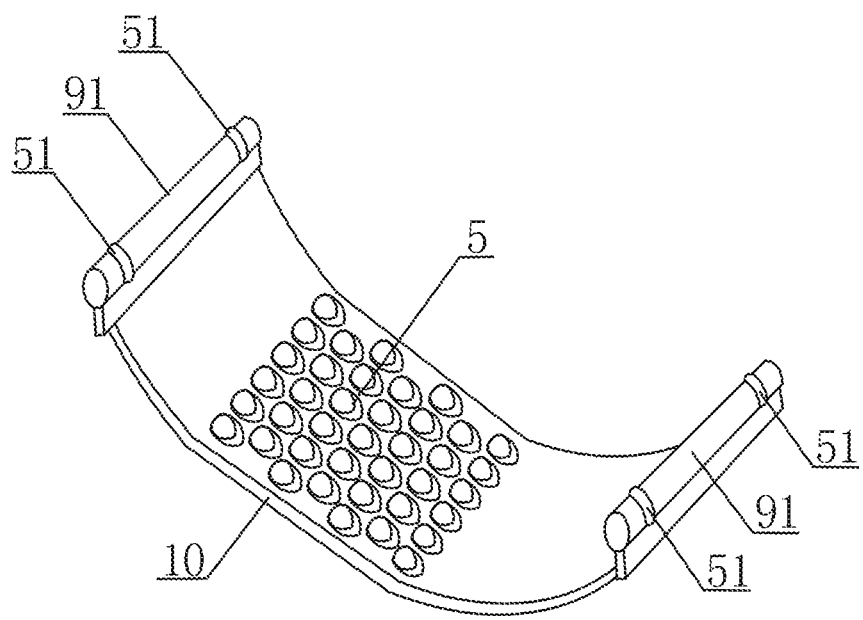
FIG. 12 is a schematic structural view of the grater of the multifunctional kitchen cooking utensil according to a preferred embodiment of the present disclosure.
Figure 13:
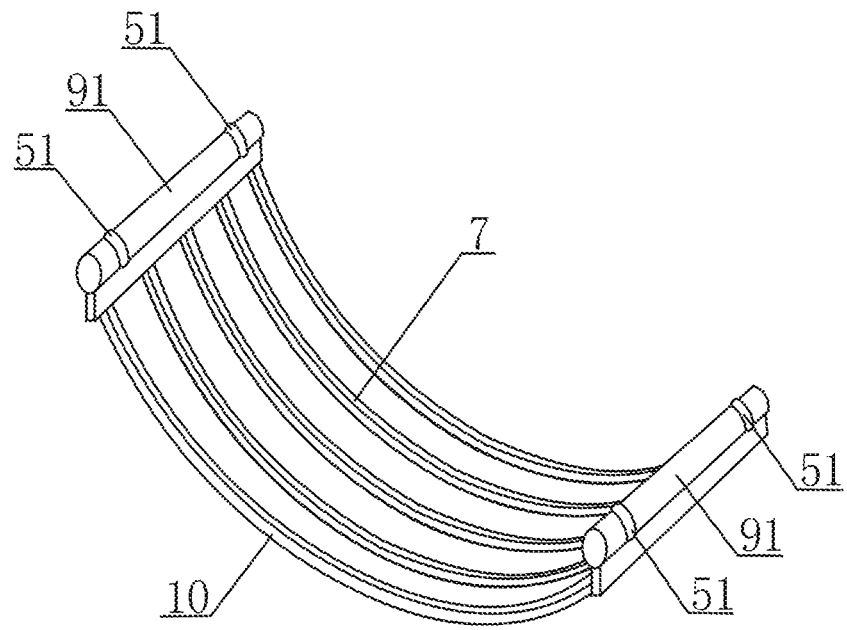
FIG. 13 is a schematic structural view of the noodle cutter of the multifunctional kitchen cooking utensil according to a preferred embodiment of the present disclosure.
Figure 14:
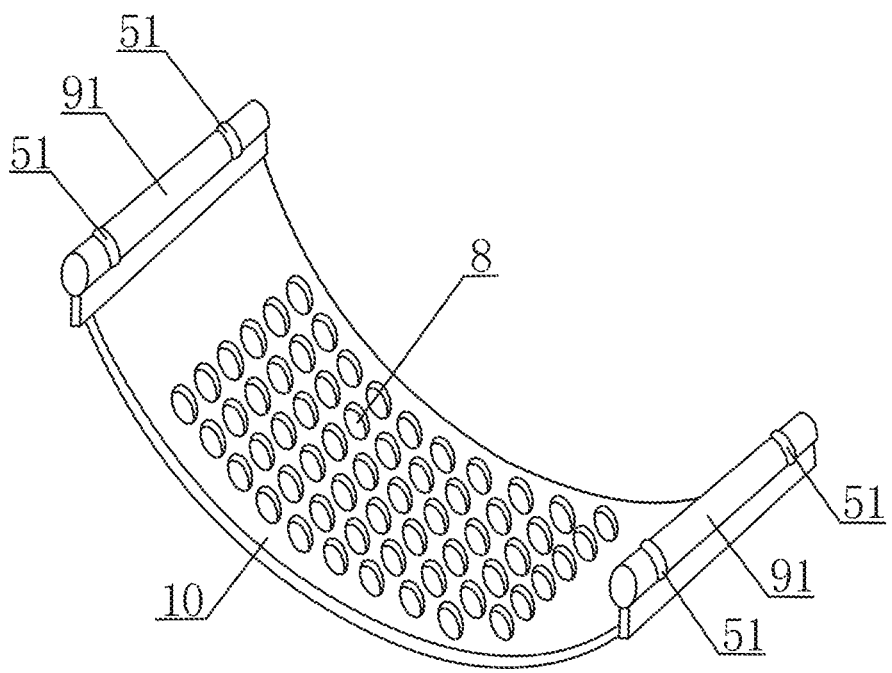
FIG. 14 is a schematic structural view of the potato granulator of the multifunctional kitchen cooking utensil according to a preferred embodiment of the present disclosure.
Figure 15:
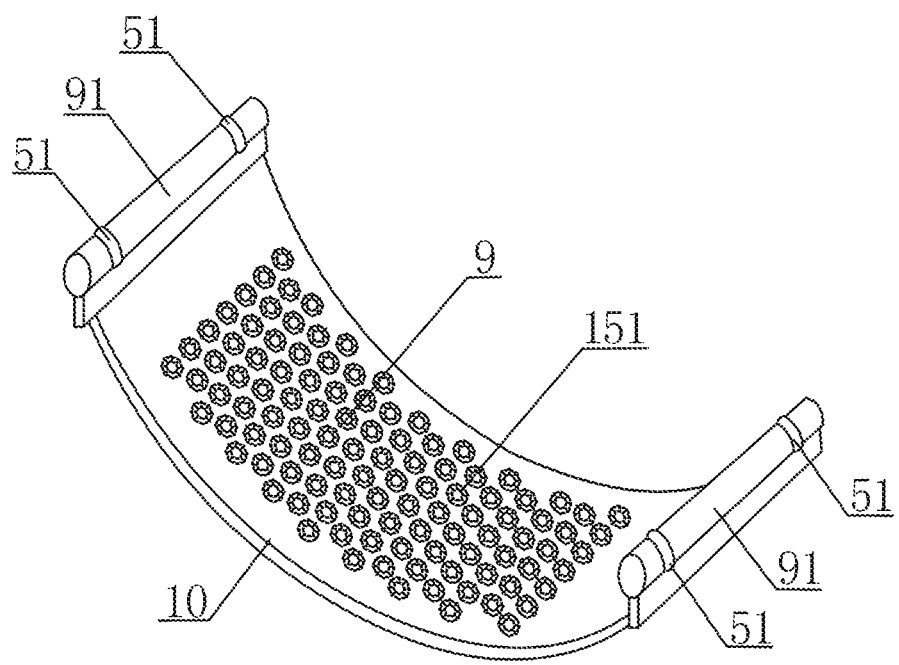
FIG. 15 is a schematic structural view of the garlic press of the multifunctional kitchen cooking utensil according to a preferred embodiment of the present disclosure.

Preferably, with reference to FIG. 11, FIG. 12, FIG. 13, FIG. 14, and FIG. 15, the tool piece 10 is designed to an arc shape, and includes a slicer 1, a grater 5, a noodle cutter 7, a potato granulator 8, and a garlic press 9; wherein two ends of each of the slicer, the grater, the noodle cutter, the potato granulator, and the garlic press are each provided with the circular pin 91 engaged with the hole slot, and the circular pin of each of these tool pieces is provided with the protruded ring. The edge of the tool piece is engaged with the protruded edge 11 of the base, to fix the tool piece to the base.

Preferably, the slicer 1 may be configured to prepare vegetable slices, or may be configured to peel fruits. Nevertheless, during manufacture, a blade dedicated for peeling the fruits may be designed independently aside the slicer by the manufacturer.

Preferably, the garlic press is provided with a plurality of prismatic press holes 151. The prismatic press holes may be designed to have three to twelve angles. The prismatic is small in a lower hole surface and large in an upper hole surface, and is in a horn shape. In practical manufacture, four-angle, five-angle, six-angle, seven-angle, eight-angle, nine-angle, ten-angle, eleven-angle, and twelve-angle prismatic press holes may be customized by the manufacturer, and also a right-angle prismatic press hole having consistent upper and lower hole surfaces may be manufactured.

Preferably, a bottom of the hole slot is provided with a gap 101, the hole slot is resilient and compressible, when the circular pin is inserted into the slot groove, the hole slot expands outwards, and when the circular pin of the tool piece 10 is wholly inserted, two ends of the circular pin are aligned with two ends of the hole slot and compressed in the hole slot, such that the protruded ring is engaged within the recessed ring by giving out a sound to fix the tool piece. During replacement of the tool piece, the circular pine 91 of the tool piece is pushed aside.

Preferably, two ends of each of the slicer 1, the grater 5, the noodle cutter 7, the potato granulator 8, and the garlic press 9 are each provided with the circular pin 91 configured to be engaged with the hole slot. During use, the desired tool piece only needs to be mounted.

Preferably, according to the present disclosure, the upper assembly 99, the base 29, the slicer 1, the grater 5, the noodle cutter 7, the potato granulator 8, and the garlic press 9 are packaged in the same package box, and spaced partitions are arranged in the package box for receiving the tool pieces. Each tool piece is independently received in a spaced partition. After use, the cleaned tool pieces are placed into the corresponding spaced partitions, and it is convenient to use the tool piece for a next time. The utensil according to the present disclosure may be applied to cap opening of beer, slicing, peeling, grating, ginger grinding, potato granulation, and noodle cutoff, which achieves integration of uses of the kitchen cooking utensil, and saves a large amount of space, and a large quantity of resources.

The above described embodiments are merely preferred embodiments of the present disclosure, but are not intended to limit the present disclosure. A person skilled in the art would derive various modifications and variations based on these embodiments. Any modification, equivalent replacement, and improvement made without departing from the spirit and principle of the present disclosure shall fall within the protection scope of the present disclosure.

What is claimed is:

1. A multifunctional kitchen cooking utensil, comprising an upper assembly (99) and a base (29) supporting the upper assembly; wherein the upper assembly comprises a handle (6), a primary connecting piece (2), a secondary connecting piece (21), and a tool piece (10), the handle being connected to upper ends of the primary connecting piece and the secondary connecting piece, the tool piece being detachably connected to lower ends of the primary connecting piece and the secondary connecting piece, the upper ends of the primary connecting piece and the secondary connecting piece being both provided with a pin hole (3), opposite open side surfaces of the pin hole being provided with a projection (55) receivable in a hole position (61) of the handle, the projection being received in the hole position and a screw (22) passing through the pin hole to fixedly connect the handle, the upper end of the primary connecting piece being bent and provided with a button (110), the lower ends of the primary connecting piece and the secondary connecting piece being provided with a hole slot (81), two ends of the tool piece being each provided with a circular pin (91) mated and engaged with the hole slot, two ends of the circular pin being provided with a protruded ring (51), and the protruded ring being engaged with a recessed ring arranged on an inner wall of the hole slot; wherein when the circular pin is inserted into the hole slot, the tool piece is movably connected to the lower ends of the primary connecting piece and the secondary connecting piece and is locked by engagement of the protruded ring and the recessed ring, the tool piece is locked to the lower ends of the primary connecting piece and the second connecting piece and received in the base, two sides of the base each protrude to define a protruded edge (11), a middle of the base is recessed to define a groove (111), the base is further provided with a cap opener (52), a lifted edge (36), a plateau (101), and diamond teeth (4), wherein the cap opener is arranged on a left end of the base, the lifted edge is sharp and configured to lift up pomelo peel to a right end of the base, the plateau is arranged on a lower end portion of the base and in contact with a table to prevent the upper assembly from rolling, and the diamond teeth are configured to grind ginger.

2. The multifunctional kitchen cooking utensil according to claim 1, wherein the tool piece (10) interchangeably comprises one of a slicer (1), a grater (5), a noodle cutter (7), a potato granulator (8), and a garlic press (9); wherein two ends of each of the slicer, the grater, the noodle cutter, the potato granulator, and the garlic press are each provided with the circular pin (91) engaged with the hole slot, and the circular pin of each of these tool pieces is provided with the protruded ring.

3. The multifunctional kitchen cooking utensil according to claim 1, wherein a bottom of the hole slot is provided with a gap (112), the hole slot is resilient and compressible, when the circular pin is inserted into the hole slot, the hole slot expands outwards, and when the circular pin is wholly inserted, the two ends of the circular pin are aligned with two ends of the hole slot and compressed in the hole slot, such that the protruded ring is engaged within the recessed ring to fix the tool piece.

\* \* \* \* \*